July 21, 1942. A. THOMAS 2,290,827
RECORD CARD CONTROLLED STATISTICAL MACHINE
Filed Aug. 31, 1939 15 Sheets-Sheet 1

INVENTOR
ARTHUR THOMAS
BY Sydney E. Page
ATTORNEY

July 21, 1942. A. THOMAS 2,290,827
RECORD CARD CONTROLLED STATISTICAL MACHINE
Filed Aug. 31, 1939 15 Sheets-Sheet 2

INVENTOR
ARTHUR THOMAS
BY Sydney E. Page.
ATTORNEY

July 21, 1942.  A. THOMAS  2,290,827
RECORD CARD CONTROLLED STATISTICAL MACHINE
Filed Aug. 31, 1939   15 Sheets-Sheet 3

INVENTOR
ARTHUR THOMAS
BY
Sydney E. Page
ATTORNEY

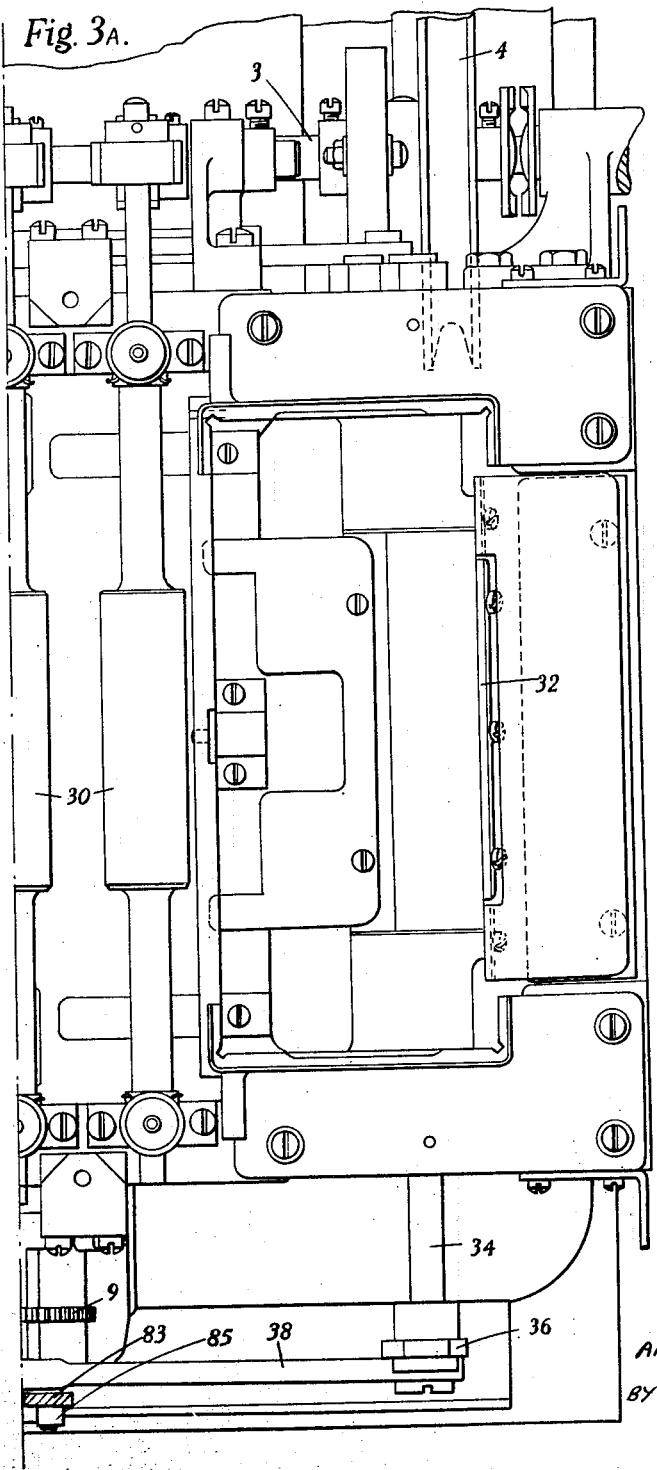

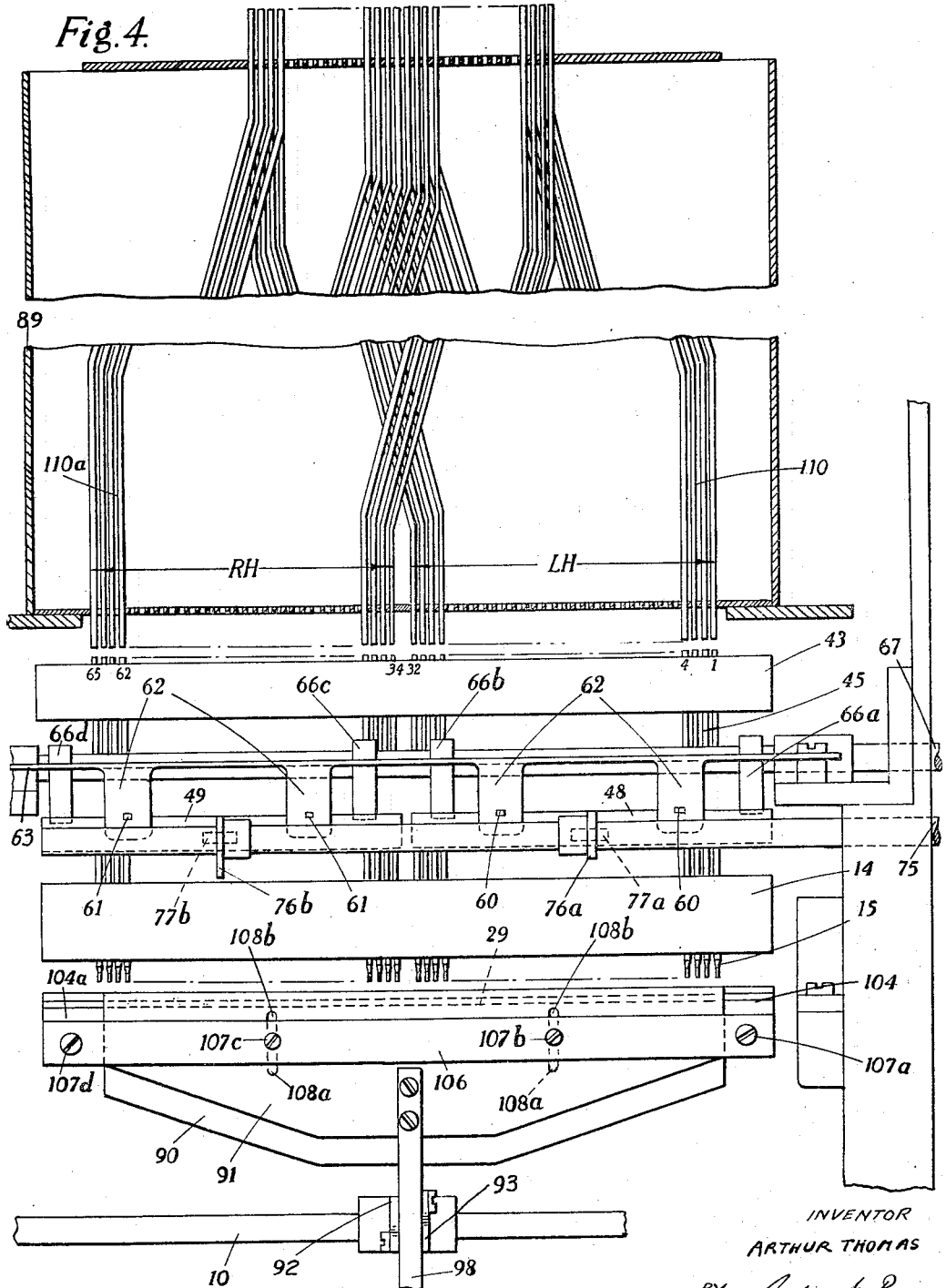

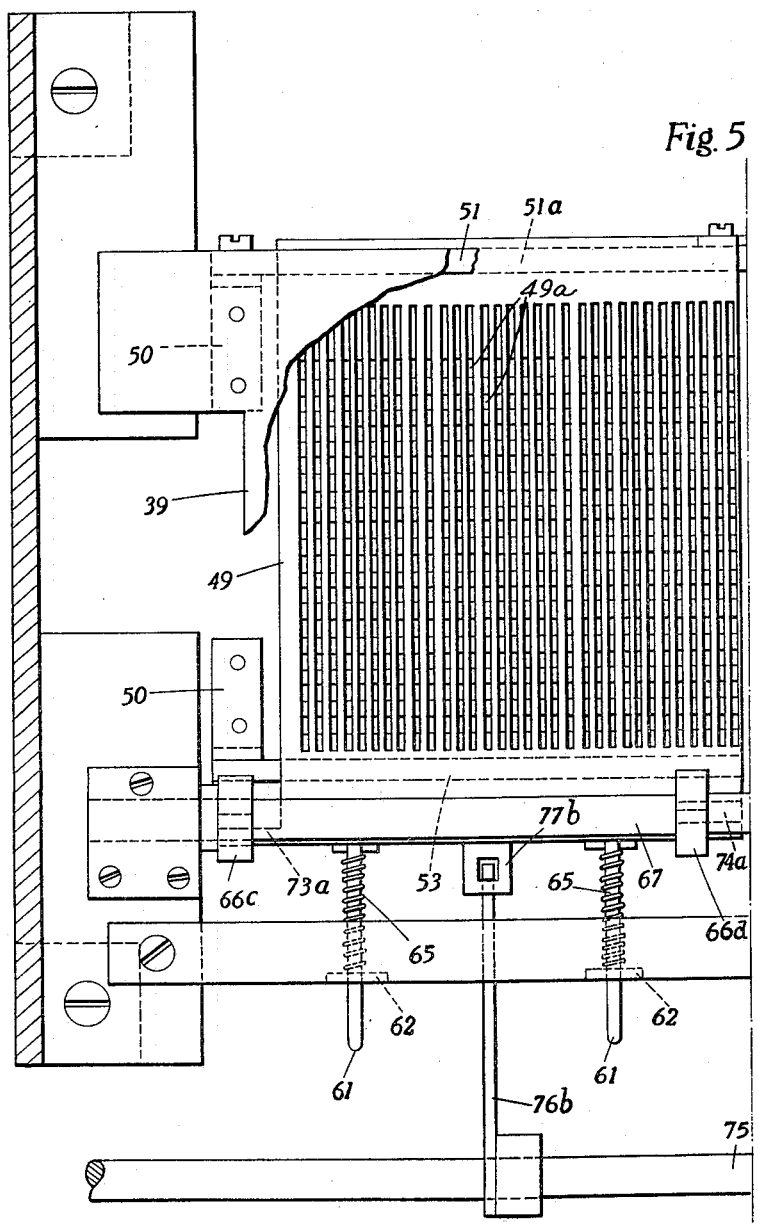

July 21, 1942.  A. THOMAS  2,290,827
RECORD CARD CONTROLLED STATISTICAL MACHINE
Filed Aug. 31, 1939   15 Sheets-Sheet 7

INVENTOR
ARTHUR THOMAS
BY Sydney E. Page
ATTORNEY

July 21, 1942.  A. THOMAS  2,290,827
RECORD CARD CONTROLLED STATISTICAL MACHINE
Filed Aug. 31, 1939    15 Sheets-Sheet 8
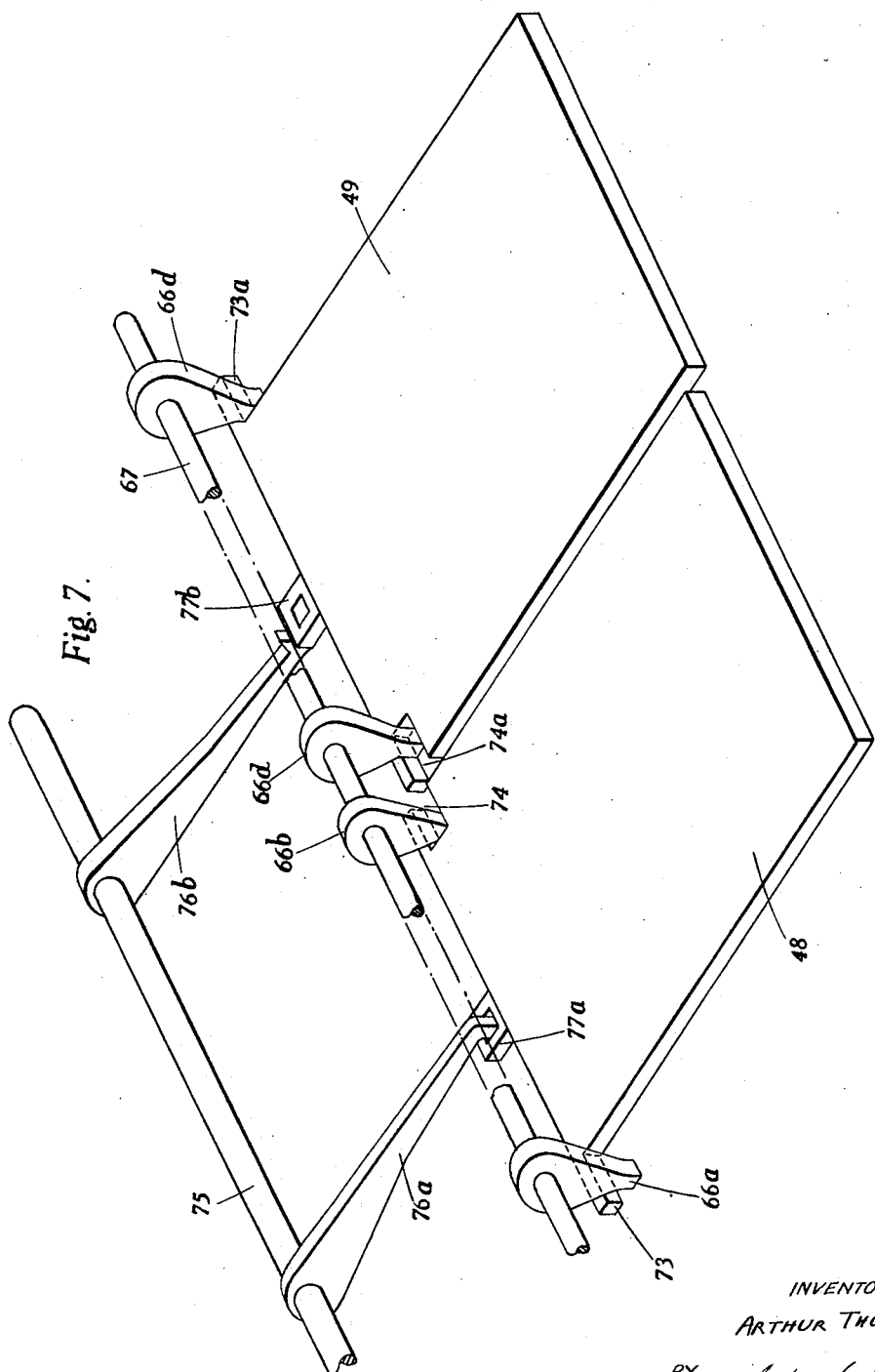
INVENTOR
ARTHUR THOMAS
BY
ATTORNEY

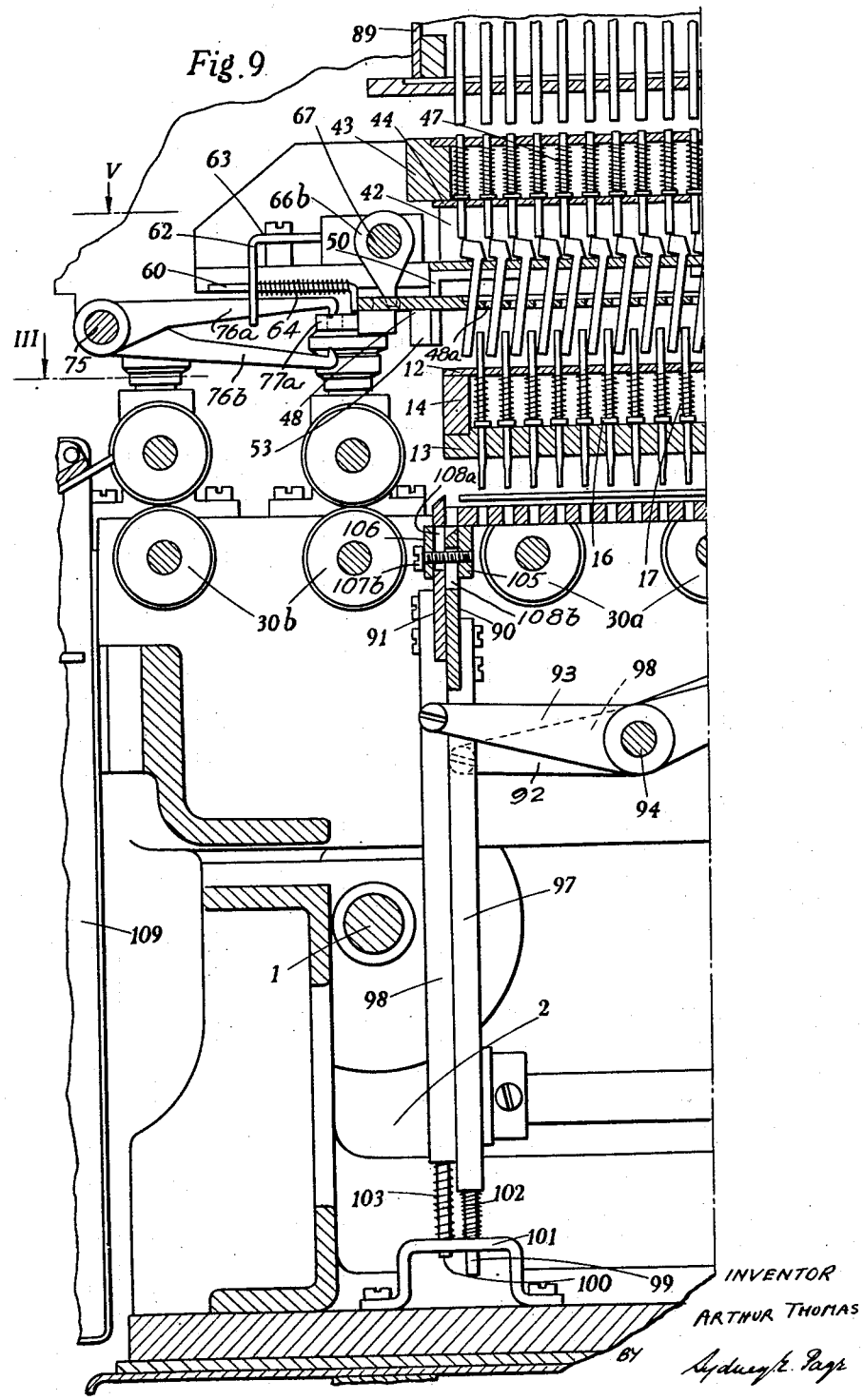

July 21, 1942.    A. THOMAS    2,290,827
RECORD CARD CONTROLLED STATISTICAL MACHINE
Filed Aug. 31, 1939    15 Sheets-Sheet 10
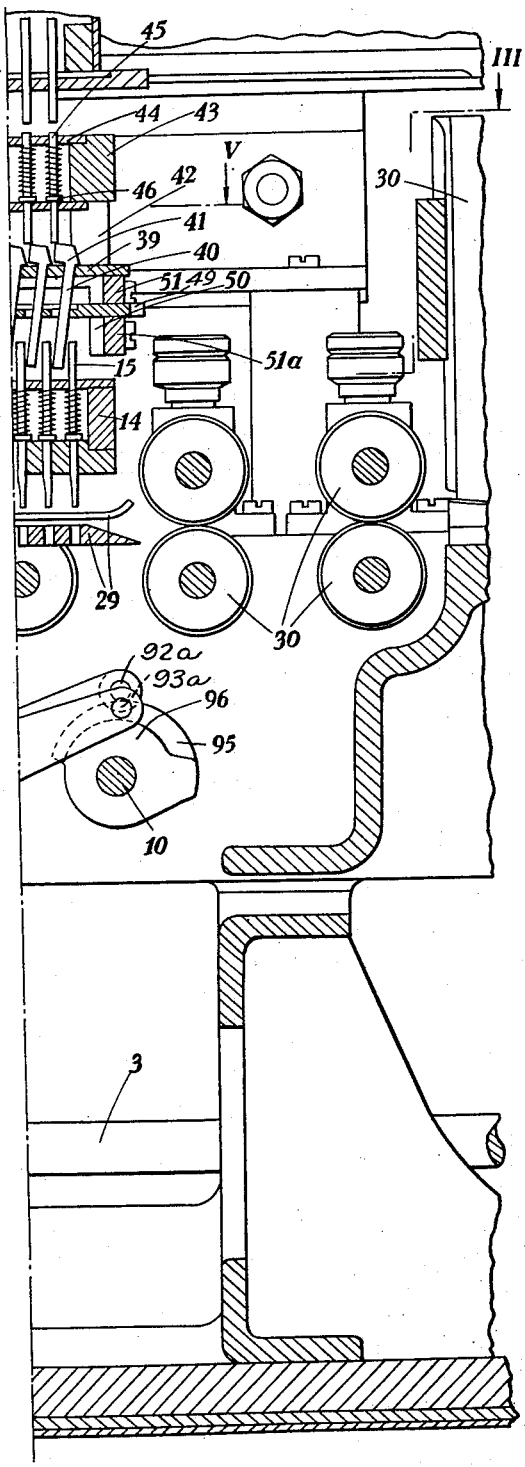
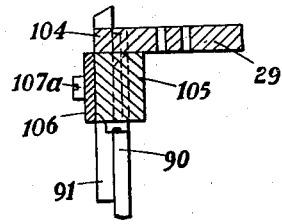
Fig. 10.
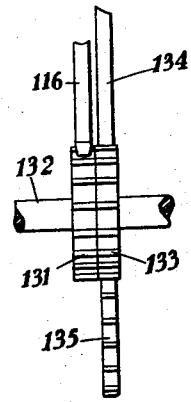
Fig. 11.
INVENTOR
ARTHUR THOMAS
BY Sydney E. Page.
ATTORNEY

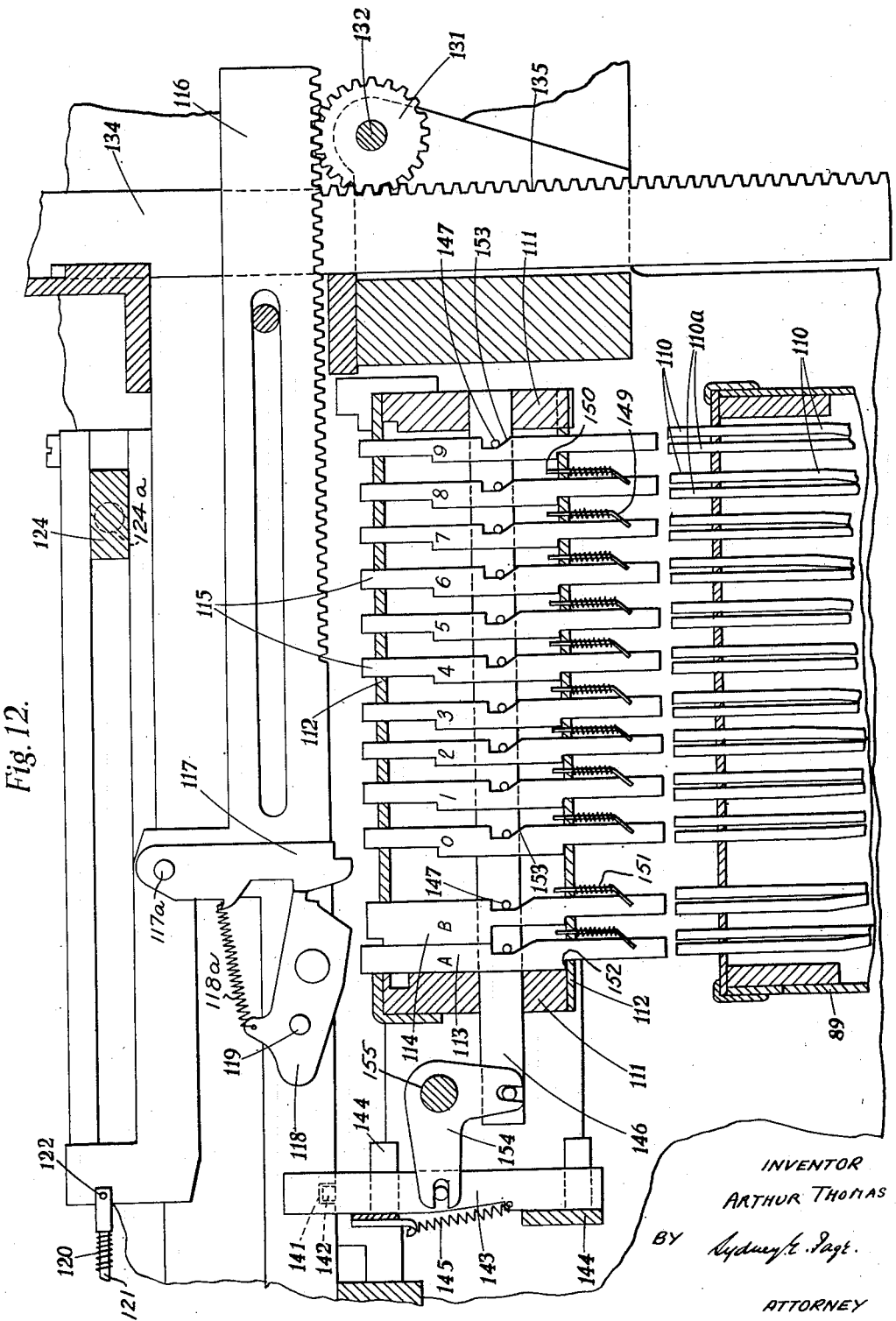

July 21, 1942.   A. THOMAS   2,290,827
RECORD CARD CONTROLLED STATISTICAL MACHINE
Filed Aug. 31, 1939   15 Sheets-Sheet 12
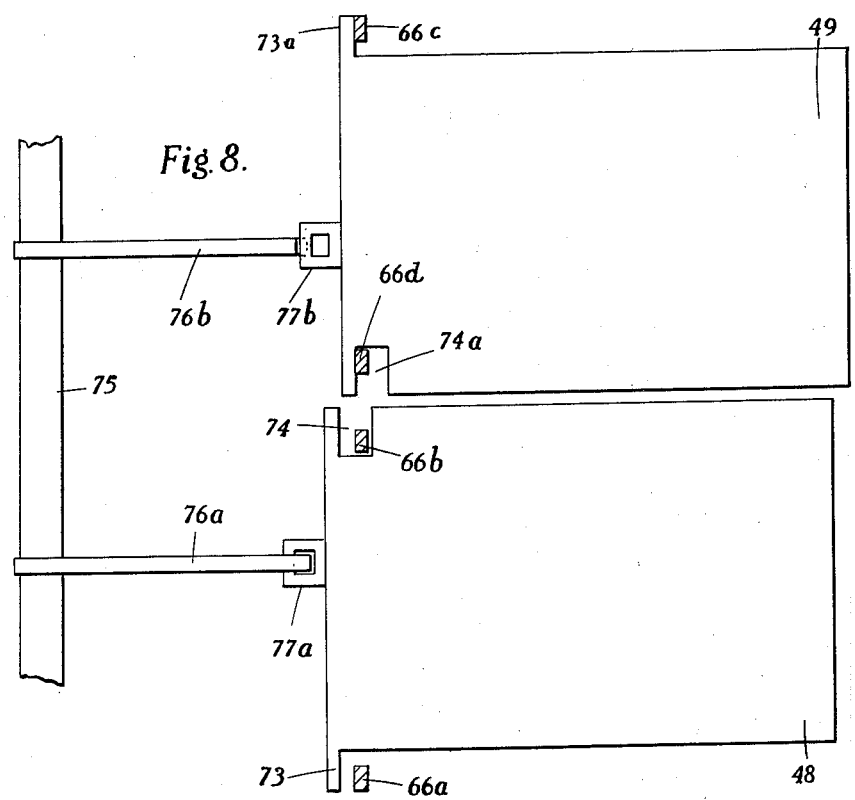
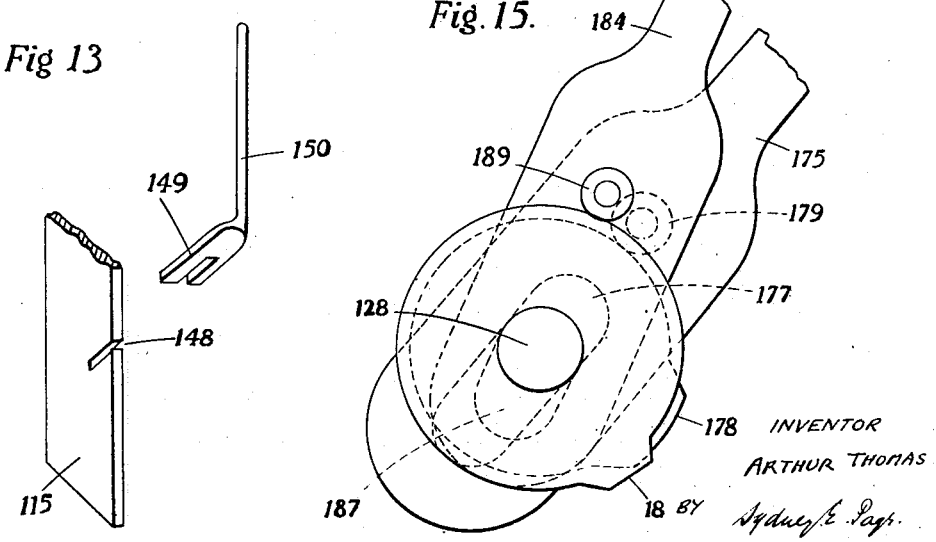
INVENTOR
ARTHUR THOMAS
BY Sydney E. Page
ATTORNEY July 21, 1942.                A. THOMAS                    2,290,827
              RECORD CARD CONTROLLED STATISTICAL MACHINE
                  Filed Aug. 31, 1939        15 Sheets-Sheet 13
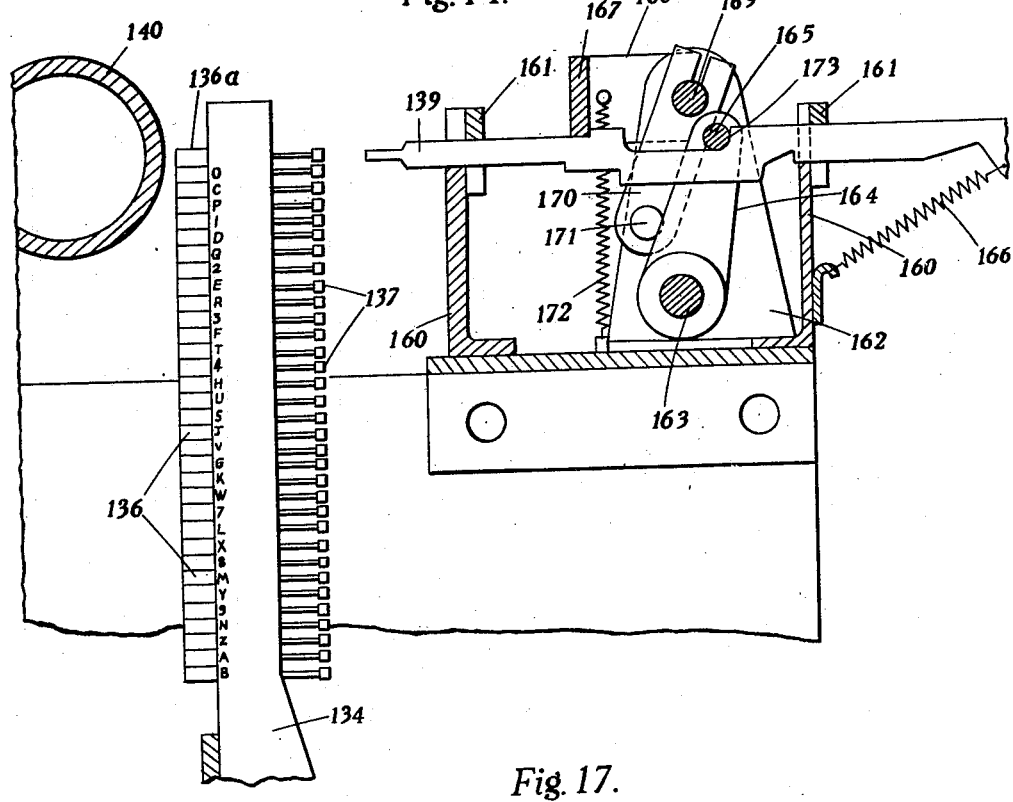
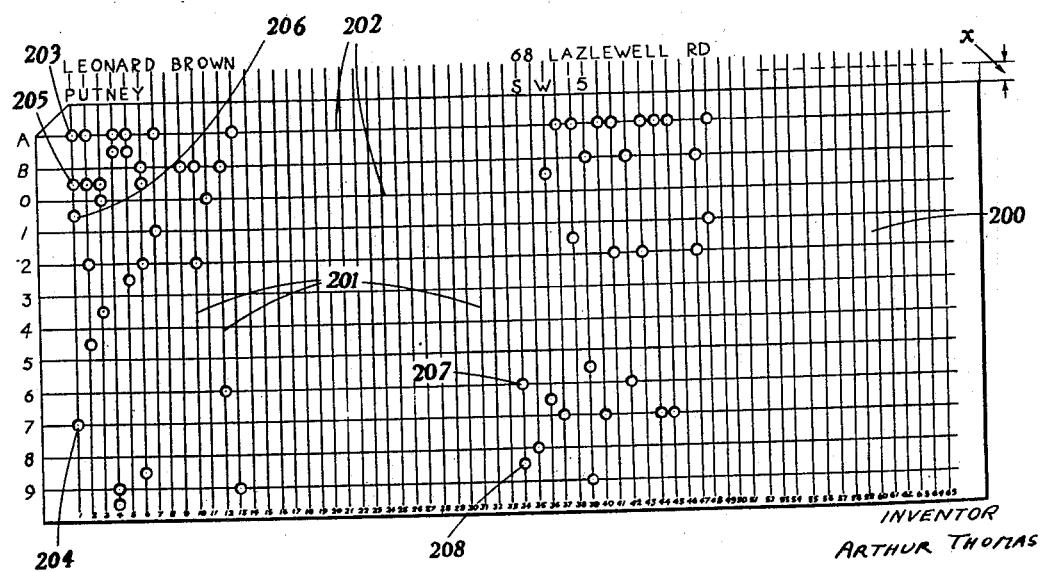
INVENTOR
ARTHUR THOMAS
BY Sydney E. Page
ATTORNEY July 21, 1942.  A. THOMAS  2,290,827
RECORD CARD CONTROLLED STATISTICAL MACHINE
Filed Aug. 31, 1939  15 Sheets-Sheet 14

INVENTOR
ARTHUR THOMAS
BY
Sydney E. Page
ATTORNEY

Patented July 21, 1942

2,290,827

UNITED STATES PATENT OFFICE 2,290,827

RECORD CARD CONTROLLED STATISTICAL MACHINE

Arthur Thomas, Wallington, England, assignor to Powers Accounting Machines Limited, London, England, a company of Great Britain Application August 31, 1939, Serial No. 292,842
In Great Britain September 3, 1938

3 Claims. (Cl. 101—93)

This invention relates to mechanism for sensing statistical record cards and has for its object to provide a means whereby the capacity of a card of standard form may be increased.

The standard form of record card has a predetermined number of hole positions in each column. It has already been proposed to double the card capacity by utilising as a second set of hole positions the spaces between the normal hole positions. Such a card will contain two sets of perforations, the perforations of one set being displaced in the direction of the length of a column with regard to the perforations of the other set.

It has also been proposed in British Specification No. 473,757 to provide means for sensing two fields of a standard card consecutively, one field being sensed at one sensing operation, and the other field being sensed at the next following sensing operation.

Cards for use in mechanism according to the invention may have two or more sets of data punched in each of two fields. If there are two sets of data in each field the hole positions for each set of data will be displaced in the direction of the length of a column with regard to the hole positions for the other set.

The present invention comprises, in a record card controlled statistical machine, the combination of a reciprocable sensing pin box, means for arresting and holding a card in a first sensing position relative to said pin box during two consecutive reciprocations of the pin box and for then releasing said card, means for arresting and holding the card in a second sensing position relative to said pin box during the next two consecutive reciprocations of the pin box and for then releasing said card, said second sensing position being spaced relatively to said first sensing position one half the pitch of the sensing pins along the card path, a plurality of columns of settable stops, a first transmission means for setting said stops from one group of columns of pins in the pin box, a second transmission means for setting the same stops from another group of columns of pins in the pin box, a disabling device to each of said transmission means, means for rendering the disabling device for the first transmission means effective and ineffective at alternate reciprocations of the pin box, and means for rendering the disabling device for the second transmission means ineffective when the other disabling device is effective and vice versa.

In order that the invention may be fully understood, one construction of machine according thereto will now be described by way of example with reference to the accompanying diagrammatic drawings.

Figure 2:
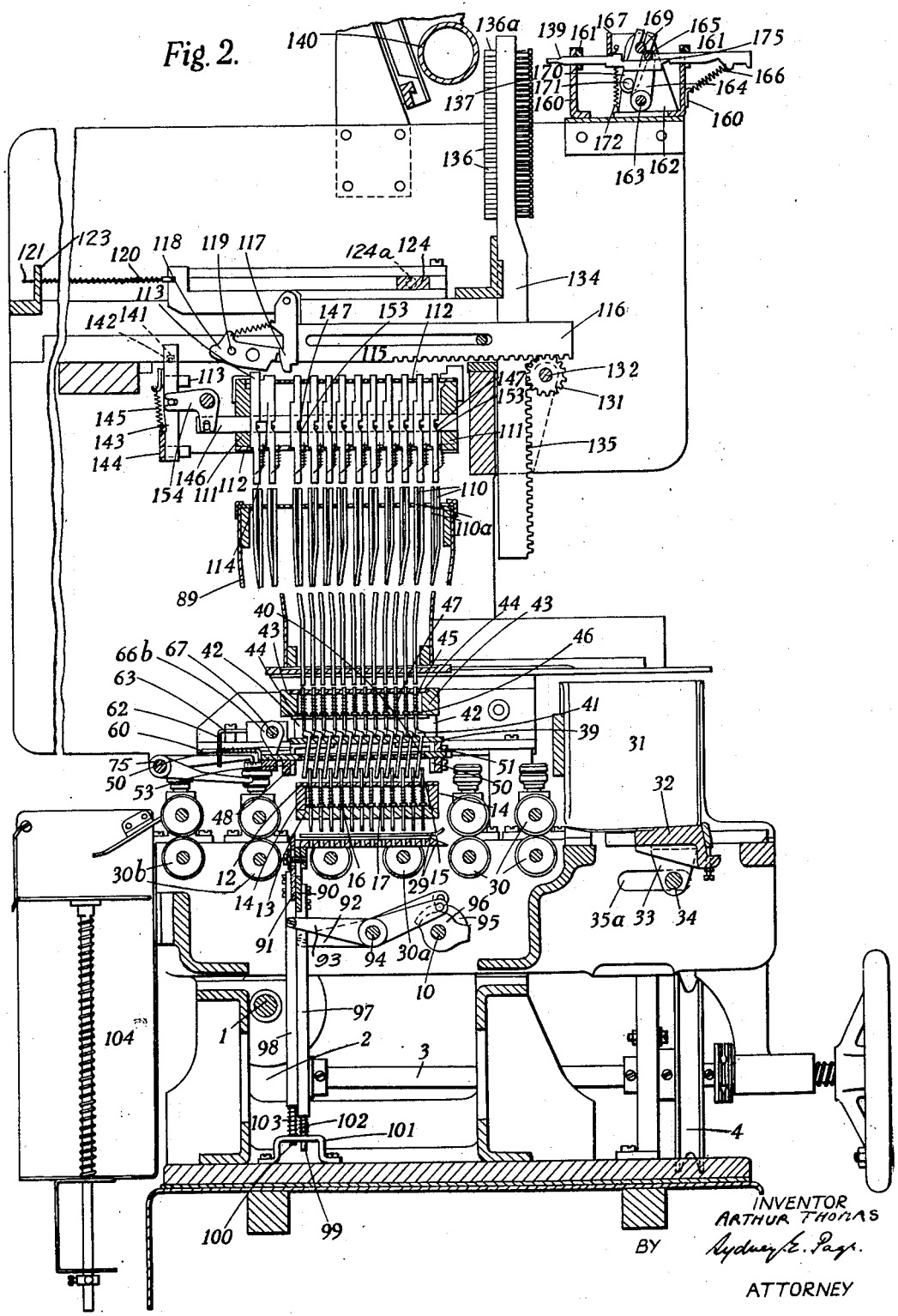
Figure 2 is a vertical section through the machine.
Figure 3:
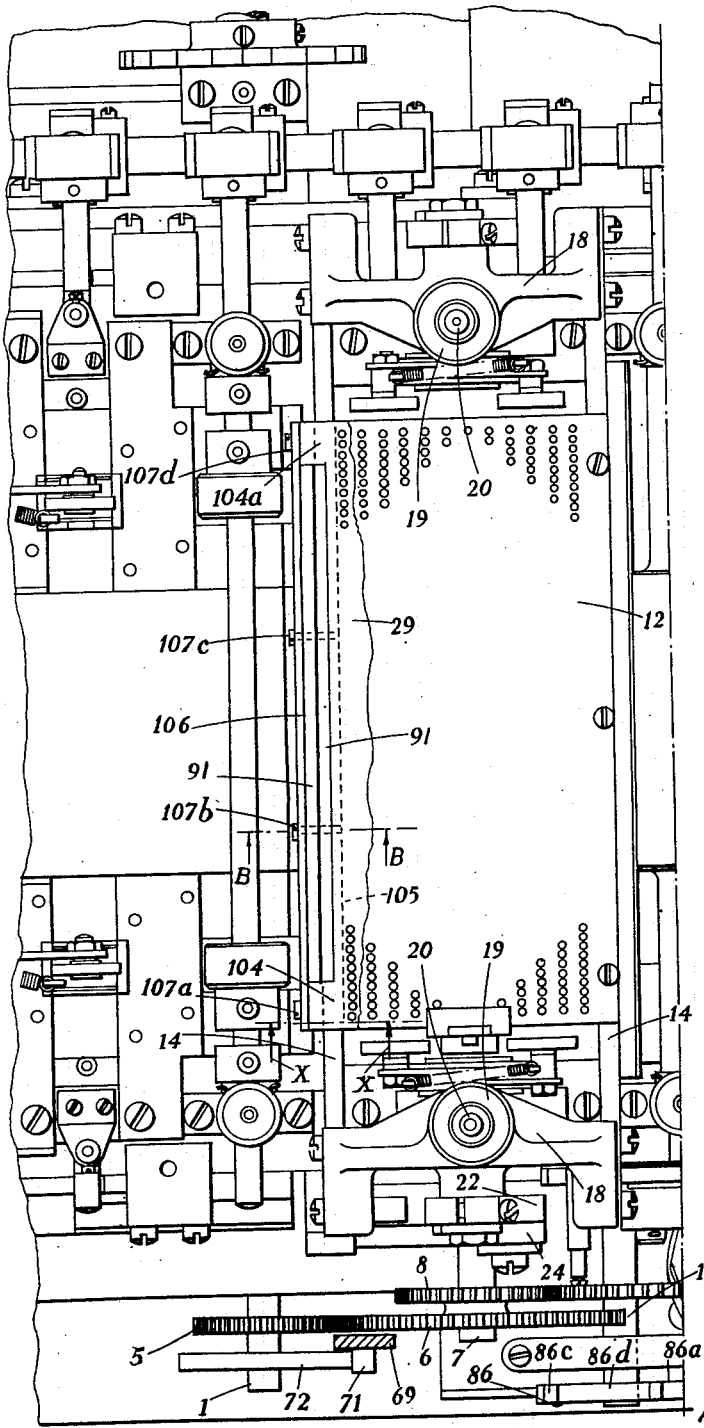
Figure 5A:
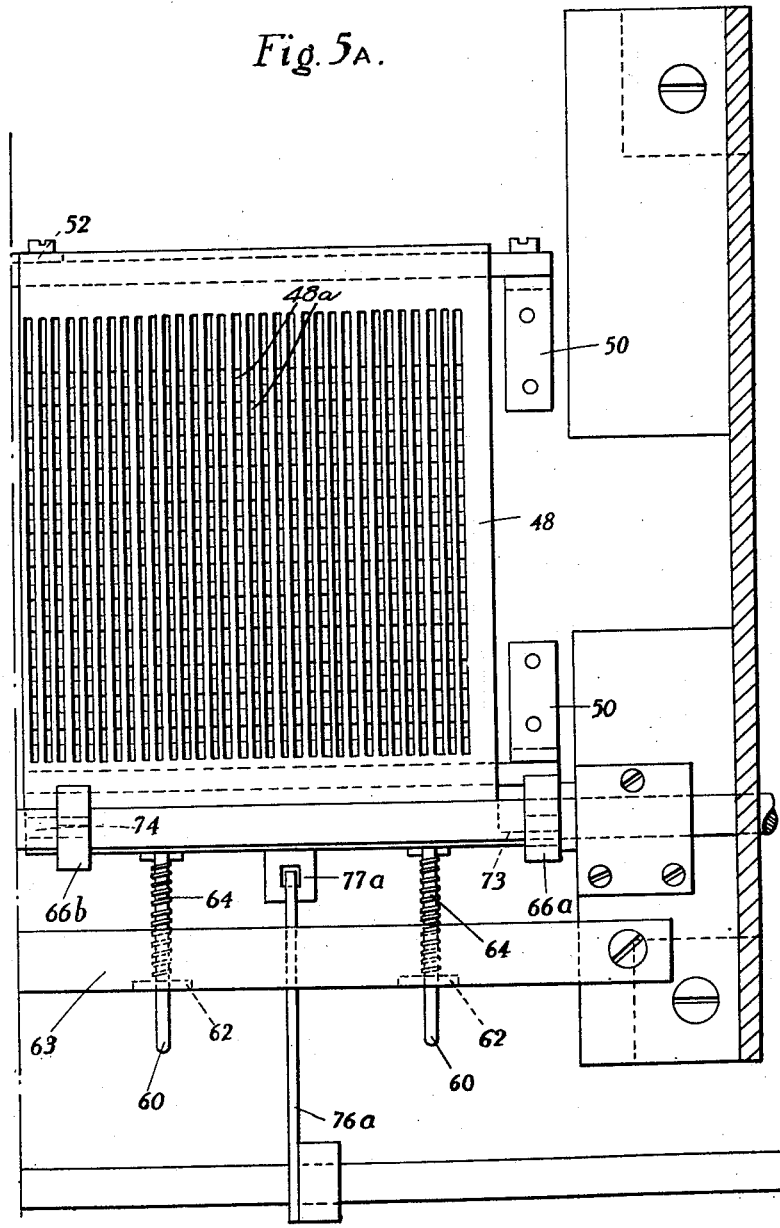
Figure 6:
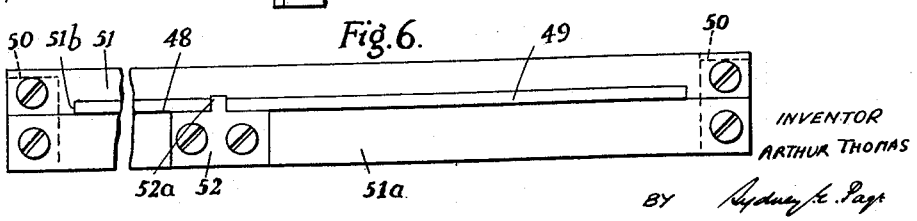
Figure 16:
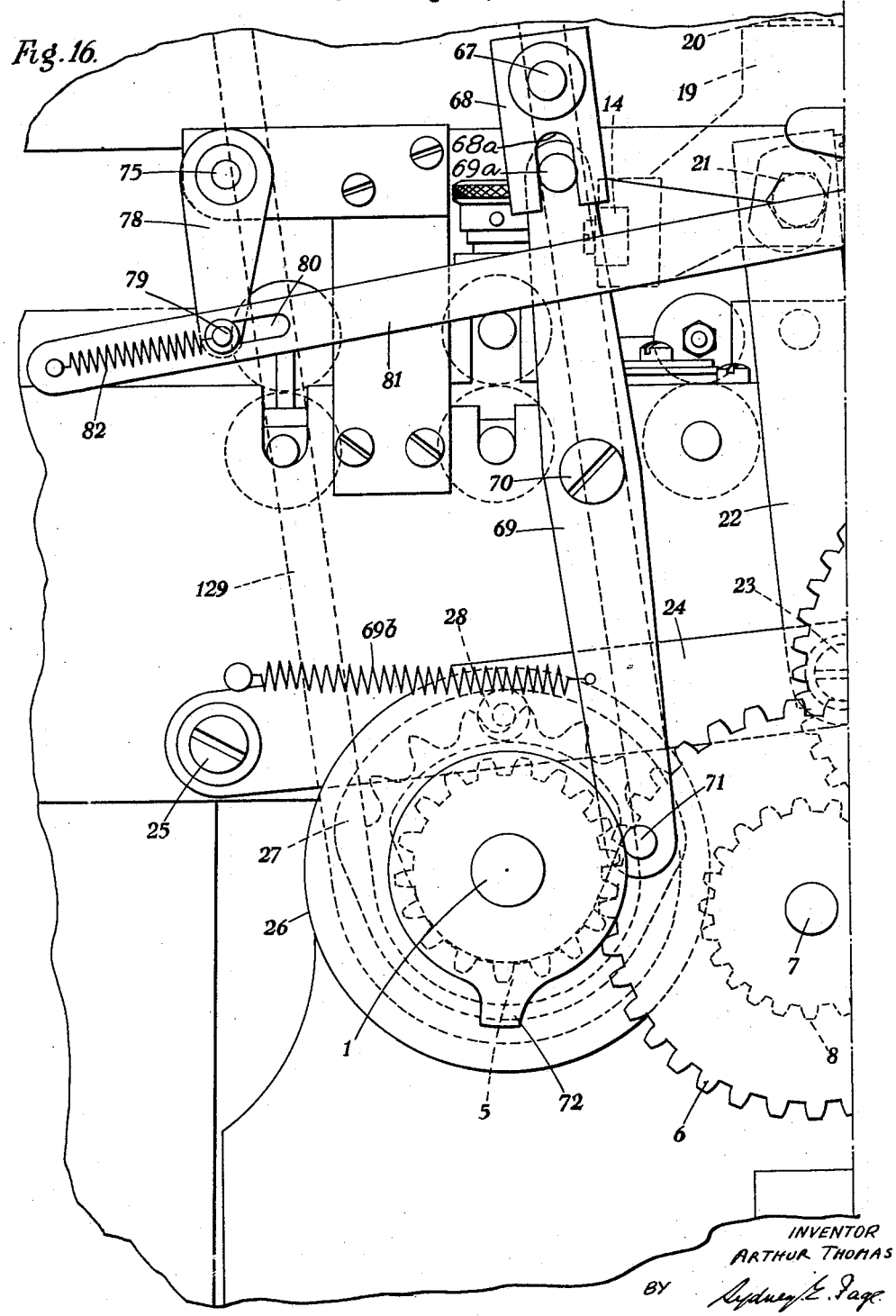
Figure 16A:
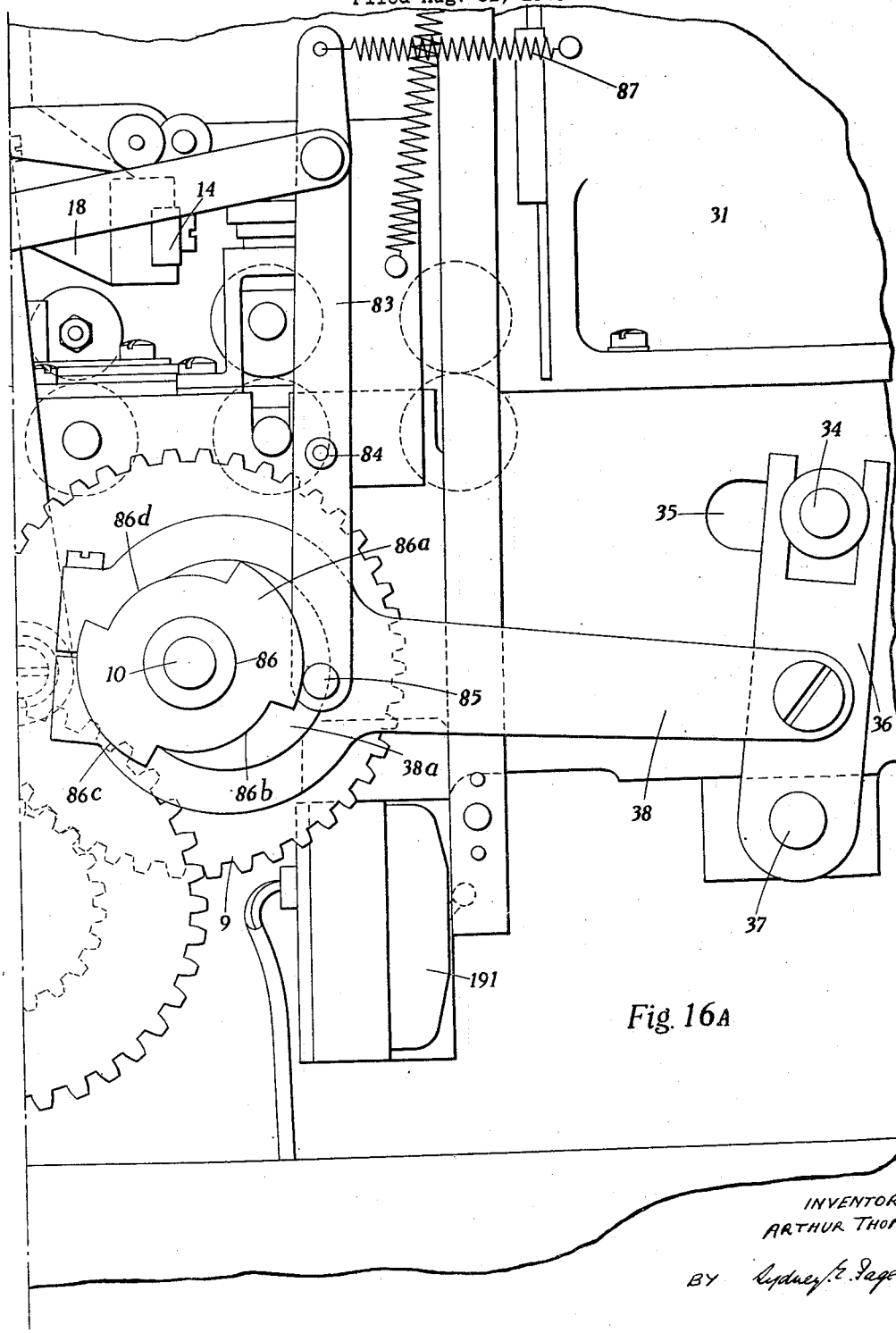

Figures 3 and 3A together form a plan view in section on the line III—III of Figures 9 and 9A;

Figures 4 and 4A together form a view of the lower part of the machine seen from the rear, the card delivery rolls and card receiver being omitted, while the connection box is shown in section;

Figures 5 and 5A together form a sectional plan on the line V—V of Figures 9 and 9A;

Figure 6 illustrates a detail of construction;

Figure 7 illustrates part of the mechanism in perspective;

Figure 8 illustrates the mechanism of Figure 7 in plan;

Figures 9 and 9A together show to a larger scale a portion of the mechanism appearing in Figure 2;

Figure 10 shows a portion of the guide for the card stops in section on the line X—X of Figure 3;

Figure 11 shows the stop basket and type bar setting mechanism in longitudinal section;

Figure 12 illustrates the connection between a setting rack and its associated type bar;

Figure 13 illstrates a detail of construction of the stops;

Figure 14 illustrates the print hammer mechanism to a larger scale;

Figure 15 illustrates also to a larger scale the cams for actuating the print hammers and the paper feed;

Figures 16 and 16A together form an outside elevation of the left-hand side of the base of the machine, and Figure 17 shows a perforated card for use with the machine according to the invention.

In the construction shown in the drawings the machine comprises a main shaft 1 (Figures 1, 2, 3, 3A, 16 and 16A) driven through a worm gear of which the housing is shown at 2, from a longitudinal shaft 3 which itself is driven through a pulley 4 from a motor (not shown). The shaft 1 carries a gear wheel 5 meshing with a gear wheel 6 on an intermediate shaft 7, and secured to the gear wheel 6 is another gear wheel 8 meshing with a gear wheel 9 secured to a shaft 10, (Figures 2, 3, 3A, 16 and 16A).

The pin box is constructed in a manner similar to that described in British Specification No. 401,012 and comprises a lower reciprocating portion and an upper fixed portion.

The lower reciprocating portion of the pin box comprises upper and lower pin plates 12 and 13 (Figures 9 and 9A) connected at each end by transverse bars 14, the plates 12 and 13 being provided in the usual manner with holes for reception of the sensing pins 15. Each pin 15 has a collar 16 resting on the lower pin plate 13 and has a spring 17 tending to press the pin downwardly.

The pin box is operated by the following mechanism:

The two transverse bars 14 are connected at each end by a casting 18 (Figs. 3, 3A, 16 and 16A) which has a boss 19 whereby the movable part of the pin box is guided for reciprocation on a post 20, fixed to the frame of the base of the machine.

Pivoted to each of the castings 18 at 21 is a link 22 pivoted at its lower end 23 to an arm 24 pivoted to the base of the machine at 25 (Figures 2, 3, 3A, 16 and 16A).

Secured to the shaft 1 is a pair of cam discs 26 in each of which there is formed a cam track 27 engaging with a roller 28 of the corresponding arm 24, whereby the castings 18 and therefore the lower portion of the pin box are reciprocated once for each revolution of the shaft 1.

Below the pins 15 are located the fixed pin plates 29, between which the card is fed by feed rolls 30, to which the cards are delivered from a magazine 31 by a picker 32 which is reciprocated in the following manner.

The picker is formed with two depending lugs 33 (Fig. 2), one at each side, and these lugs are connected by a shaft 34 of which the ends project through slots 35, 35a in the side of the frame of the machine.

Outside the frame at its left-hand end the shaft 34 is pivoted to an arm 36 (Figs. 1, 16 and 16A) pivoted to the machine frame at 37. To this arm 36 is connected an eccentric rod 38 of which the eccentric 38a is secured to the shaft 10, the gear ratio between the shaft 1 and 10 is 4:1 so that only one card is fed by the picker 32 for each four reciprocations of the lower part of the pin box.

In the manner described in British Specification No. 401,012 the upper fixed part of the pin box includes a plate 39 having holes through which pass the intermediate elements 40 which are suspended by their heads 41 from the plate 39 (Figures 2, 9 and 9A). The plate 39 is suspended from four posts 42, one at each corner, from two transverse bars 43 which are fixed to the frame of the machine.

Also secured to the transverse bars 43 are two fixed pin plates 44 having holes through which pass the transmission rods 45 (corresponding to the rods 18 shown in British Specification No. 401,012). Each rod 45 has a collar 46 and a spring 47 which pushes it downwardly, and the lower end of each rod 45 bears on the head 41 of the corresponding intermediate transmission element 40. As described in British Specification No. 401,012 each rod 45 is offset with respect to the intermediate transmission element 40, and the corresponding spring 47 tends to rock the transmission element 40 counterclockwise about its head 41.

In British Specification No. 401,012 there is described a shutter 26 and in the present construction this shutter 26 is replaced by two independent shutters 48 and 49. Each shutter 48 and 49 carries a pair of rods 60, 61 (Figures 2, 4, 4A, 5, 5A, 9 and 9A) passing through lugs 62 depending from a plate 63 fixed to the machine frame and disposed around the rods 60, 61, between the lugs 62 and the shutters are springs 64, 65 which tend to move the shutters to the right in Figure 2.

Each shutter is provided with a pair of controlling arms 66a, 66b, 66c and 66d, all of which are secured to a shaft 67 so that they operate simultaneously. The shaft 67 has secured to it at one end an arm 68 (Figures 1, 3, 3A, 16 and 16A) having a slot 68a pivotally engaging a pin 69a on a lever 69 which is pivoted between its ends to the frame of the machine at 70. At its lower end the lever 69 carries a roller 71 maintained by a spring 69b in engagement with a cam 72 fixed to the shaft 1.

The sensing pin box has sixty-five columns of sensing pins 15 and the shutter 48 controls columns Nos. 1 to 32, while the shutter 49 controls columns Nos. 34 to 65, the centre column No. 33 being unused.

In the manner described in British Specification No. 401,012 each shutter 48, 49 is formed with a plurality of columns of slots indicated at 48a and 49a in Figure 5, the number of columns of slots in each shutter corresponding to the number of columns of sensing pins controlled by that shutter. The action of the shutters is as follows:

When either shutter is in its left-hand position (position of shutter 48 in Figures 7, 8, 9, and 9A) the right-hand ends of the slots 48a, 49a hold the corresponding intermediate elements 40 over to the left, thereby preventing them from swinging in the counterclockwise direction about their heads 41 under the action of springs 47. If, however, either shutter is moved to the right then the slot permits the intermediate element to swing counterclockwise, the action of these intermediate elements being the same as the action of the intermediate elements described in British Specification No. 401,012. Accordingly if either shutter 48 or 49 is held in its position to the left then the corresponding columns of intermediate elements 40 cannot operate and the corresponding columns of the pin box are rendered inoperative.

The cam 72 rocks the shaft 67 clockwise momentarily when the pin box is at the bottom of its stroke thereby tending to move both shutters to the left. During the greater part of the revolution of the shaft 1, however, the shaft 67 is at the end of its travel in the counterclockwise direction. Therefore both shutters 48, 49, if free, would be moved over to the right by their springs 64, 65.

As will be explained later, however, during any given revolution of the shaft 1, one of the shutters is held over to the left, while the other is free to move. As illustrated in the drawings the shutter 48 is locked in its left-hand position, while the shutter 49 being free to move has followed the arms 66c and 66d in their counterclockwise movement to the right.

In order to permit one shutter to remain in its left-hand position while the shaft 67 is rocked counterclockwise, the connection between the shutters and the arms 66a, 66b, 66c and 66d is constructed as follows.

At its rear end the shutter 48 carries a laterally projecting lug 73 engaging behind the operating arm 66a. At the opposite side of the shutter 48 there is formed a recess 74 co-operating with the arm 66b. Likewise the shutter 49 is provided with a projecting lug 73a co-operating with the arm 66c and a recess 74a co-operating with the arm 66d.

When the shaft 67 rocks clockwise, the arms 66a and 66b by engaging with the lug 73 and the rear face of the recess 74 respectively, pull the shutter 48 rearwardly to the left against the action of the spring 64. If, now, the shutter 48 is locked in this position the shaft 67 can rock back in the counterclockwise direction without affecting the shutter 48 because the recess 74 is made sufficiently wide to permit of the movement of the arm 66b without engaging the forward face of the recess 74 when the shutter is held in its rearmost position.

Figure 8 illustrates this action, and in this figure the shutter 48 is shown held back to the left while the arms 66a and 66b have moved to the right, leaving a clearance between the right-hand face of the lug 73 and the arm 66a, and the left-hand face of the recess 74 and the arm 66b. The shutter 49 on the other hand, being free to operate, has followed the movement of the arms 66c and 66d so that there is a clearance between the arm 66d and the right-hand face of the recess 74a.

Reference has been made above to locking the shutters in the rearmost or left-hand position and the mechanism for performing this function will now be described. Its manner of operation and the reason for providing it will become apparent from the description of the sequence of operations of the machine which follows later.

Secured to a shaft 75 mounted in the side plates of the machine frame are two hook arms 76a and 76b (Figures 4, 4A, 5, 5A, 7, 8, 9 and 9A).

The arm 76a co-operates with an eyelet 77a secured to the rear end of the shutter 48 and the hook arm 76b co-operates with an eyelet 77b secured to the rear end of the shutter 49, the arrangement being such that when the hook of the arm 76a is in engagement with the eyelet 77a the hook of the arm 76b is out of engagement with the eyelet 77b and vice versa.

The shaft 75 has secured to it an arm 78 (Figures 1, 16 and 16A) carrying at its lower end a pin 79 engaging in a slot 80 formed in a link 81, the pin 79 being connected to the link 81 by a spring 82. At its other end the link 81 is pivoted to a lever 83 which is pivoted between its ends to the frame of the machine at 84. At its lower end the lever 83 carries a roller 85 co-operating with a cam 86 secured to the shaft 10, and at its upper end the lever 83 has a spring 87 maintaining the roller in engagement with the cam.

In the position shown in the drawings the pin box is at the top of its stroke and the roller 71 is on the lower part of the cam 72 so that the spring 69b is holding the shaft 67 rocked counterclockwise so that the arms 66a, 66b, 66c and 66d are in their forward position.

Figure 1:
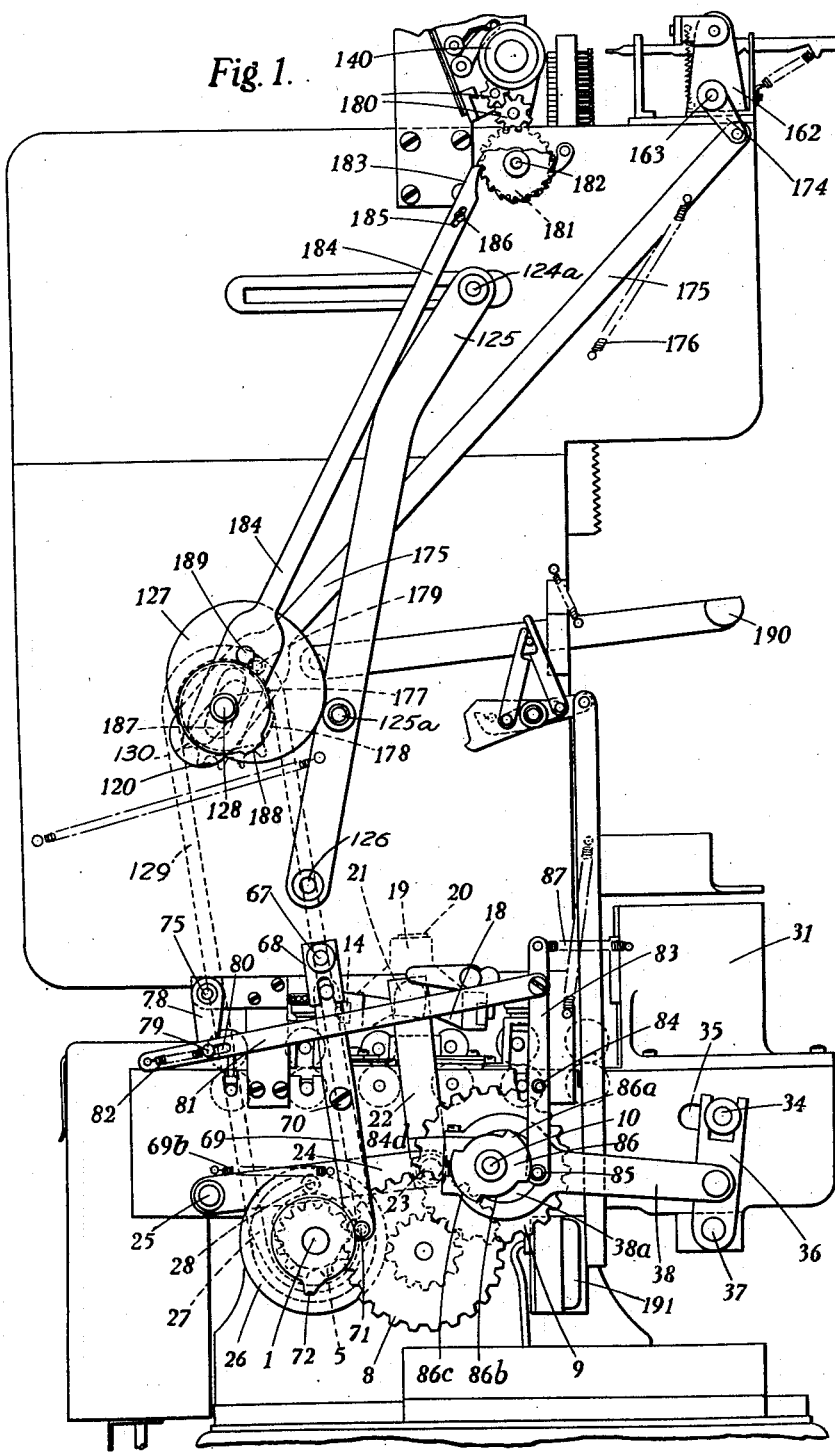
Figure 1 is an outside elevation of the left-hand side of the machine.

The cam 86 has two high parts 86a and 86c and two low parts 86b and 86d, and in the position shown in the drawings the roller 85 is on the high part 86a of the cam 86, so that the upper end of the lever 83 is held over to the left in Figures 1, 16 and 16A and the link 81 is held over to the left also. The spring 82 has caused the arm 78 and shaft 75 to rock clockwise, thereby bringing the hook 76a into engagement with the eyelet 77a, and the hook 76b out of engagement with the eyelet 77b.

In this position the hook 76a holds the shutter 48 locked in its rearmost or left-hand position (Figures 7, 8, 9 and 9A) while the shutter 49 is free to operate.

The operations which ensue during four consecutive revolutions of the shaft 1, giving one revolution of the shaft 10, will now be described.

As the shaft 1 rotates the pin box will descend and when it reaches the bottom of its stroke the cam 72 will rock the lever 69 counterclockwise, thereby rocking the shaft 67 clockwise. This brings the arms 66a, 66b, 66c, 66d into their rearmost position to the left, so that the shutter 49 is moved back into line with the shutter 48.

During the rotation of the cam 72 from the position shown in Figures 1, 16 and 16A to the position in which it engages the roller 70, the shaft 10 rotates in the same direction but to an extent equal to one quarter of the rotation of the cam 72, since the gear ratio of the shafts 1 and 10 is 1:4.

This movement of the shaft 10 brings the high part 86a of the cam 86 clear of the roller 85, and this action occurs before the cam 72 reaches the roller 70. Nevertheless the lever 83 does not immediately rock clockwise, since it is prevented from doing so by engagement of the hook 76b with the underside of the eyelet 77b of the shutter 49 which at this time is in its right-hand position.

Then, when as explained above the shutter 49 is brought back to the left the aperture in the eyelet 77b is brought into register with the hook 76b so that the spring 87 can now rock the lever 83 clockwise, thereby rocking the shaft 75 counterclockwise, whereby the hook 76b moves up into engagement with the aperture in the eyelet 77b, while the hook 76a is disengaged from the eyelet 77a. Accordingly on the next revolution of the shaft 1 the shutter 48 is free to operate while the shutter 49 is held in its left-hand position.

Immediately after the hooks 76a and 76b have thus operated, the cam 72 passes beyond the roller 70 and the spring 69b rocks the shaft 67 back in the counterclockwise direction, thereby moving the shutter 48 to the right, while the shutter 49 which is retained by the hook 76b remains to the left.

Before the cam 72 engages the roller 70 for a second time, the high part 86c of the cam 86 engages the roller 85 and rocks the lever 83 counterclockwise, thereby moving the link 81 to the left. The arm 78, however, cannot follow the link 81 in this movement because at this time the shutter 48 is in its right-hand position, therefore the hook element 76a is in engagement with the upper surface of the eyelet 77a. When, however, the cam 72 next rocks the lever 69 counterclockwise, thereby bringing the shutter 48 back to the left, the spring 82 rocks the arm 78 clockwise, thereby causing engagement of the hook 76a with the eyelet 77a and disengagement of the hook 76b from the eyelet 77b. Thus the shutter 49 is now free again, while the shutter 48 is locked in its rearmost position.

Before the cam 72 reaches the roller 70 during the third revolution of the pin box shaft 1, the low portion 86d of the cam 86 has reached the roller 85. The arm 83, however, does not immediately rock clockwise since at this time the shutter 49 is held in its rearmost position to the left, and therefore the hook 76b is in engagement with the underside of the lug 77b. When, however, the cam 72 rocks the lever 69 and therefore brings the shutter 49 back to its left-hand position, the spring 87 will be able to rock the lever 83 clockwise and therefore to rock the shaft 75 counterclockwise whereby the shutter 49 is locked in its rearmost position, while the shutter 48 is released.

Before the cam 72 reaches the roller 70 during the fourth revolution of the pin box, the high part 86a of the cam 86 has again reached the roller 85 and has rocked the lever 83 counterclockwise, thereby moving the link 81 to the left. The arm 78, however, cannot follow this movement, because at this time the shutter 48 is in its forward position, and therefore the hook 76a is resting on the upper surface of the eyelet 77a. When, however, the cam 72 rocks the shaft 67 clockwise, and brings the shutter 48 back to its rearmost position then the spring 82 will rock the arm 78 and the shaft 75 clockwise, thereby causing the hook 76a to engage the eyelet 77a and disengaging the hook 76b from the eyelet 77b.

It will thus be seen that during the first, third, fifth and so on revolution of the pin box operating shaft 1 the shutter 49 is locked in its rearmost position, while the shutter 48 is free to operate; while during the second, fourth, sixth, and so on, revolution of the pin box operating shaft 1 the shutter 48 is locked in its rearmost position while the shutter 49 is free to operate.

Both the shutters 48 and 49 are constructed and operate when permitted in the same manner as the shutter 26 described in British Specification No. 401,012, that is to say, when for example, the shutter 48 is held over in the rearmost position it holds all the intermediate elements 40 over to the left and prevents them from engaging over the pins 15, so that any pin which finds a hole is inoperative because the corresponding intermediate element 40 does not rock into line with the pin.

When, however, the shutter 48 is permitted to move to the right at the bottom of the stroke of the pin box, then any pin which has found a hole will descend until its upper end is below the lower end of the intermediate element 40, and the latter will swing into engagement with the pin so that on the ensuing up stroke of the pin box, the pin 15 will push the element 40 upwardly and through the corresponding transmission rod 45 will operate a corresponding wire in the connection box 89.

By means of the mechanism just described one half of the card is sensed during the first, third and fifth and so on operation of the pin box, and the other half of the card is sensed during the second, fourth, sixth and so on operation of the pin box. As already explained the card is divided into two fields, and the first and third lines of the address are punched in one field, while the second and fourth lines are punched in the other field, each field occupying half the card. The hole positions for the reception of the third line are displaced from those for the reception of the first line to the extent of half the pitch of the hole positions in the direction of the column, and the hole positions for the second line are similarly displaced from those for the fourth line.

Since the first half of the card contains both the first and third lines of the name and address, it is necessary to displace the card by half the pitch of the hole positions in the direction of the column between the second and third sensing operations.

Likewise it is necessary to displace the card between the fourth and fifth sensing operations. To this end two card stops 90 and 91 (Figures 2, 3, 3A, 4, 4A, 9, 9A and 10) are provided which are operated through levers 92 and 93, pivoted on a transverse shaft 94, by means of respective cams 95 and 96 secured to the shaft 10 which rotates once for each four revolutions of the pin box operating shaft 1.

Each card stop 90, 91, comprises a plate screwed to a vertical post 97 and 98 respectively, each post terminating at its lower end in a rod 99, 100, guided in a bracket 101 screwed to the base of the machine, a spring 102, 103, around each rod 99, 100, serving to urge the respective card stop 90, 91 upwardly.

At their upper end the card stops 90, 91 are guided in the following manner. The lower of the two fixed pin plates 29 is formed with two extensions, one at each side, 104, 104a (Figure 3) and attached to the underside of these extensions is a bar 105 (Figures 3, 9 and 10) which is cut away in a manner similar to the portion of the plate between the extensions 104, 104a to admit the two card stops. (In Figure 9 the bar 105 appears in cross section on the line B—B of Figure 3.) Screwed to the rear face of this bar is a retaining plate 106 (Figures 3, 4, 4A, 9 and 10) which is attached to the bar 105 by four screws 107a, 107b, 107c and 107d (Fig. 4). The two centre screws 107b and 107c pass through slots 108a, 108b formed in the card stops to permit the reciprocation of the latter. The card stops are therefore held against lateral movement by the inside faces of the two extensions 104, 104a of the pin plate 29 and against backward or forward movement by the retaining plate 106 and the rear edges of the plate 29 and of the bar 105.

Early in the first of the four revolutions of the pin box shaft 1 corresponding to one revolution of the shaft 10, the rollers 92a, 93a on levers 92 and 93 are in contact with the low portions of cams 95 and 96 respectively so that the springs 102, 103 will hold both card stops 90 and 91 raised whereby the card which was fed by the picker 32 during the latter portion of the preceding revolution of the shaft 1 is arrested by the front card stop 90. The pin box then descends and senses this card, but since during this revolution the right-hand shutter 49 is held out of operation by the hook 76b only the left-hand half of the pin box is operative and therefore only the left-hand half of the card is sensed. The front card stop 90 arrests the card in position for sensing the first line of the address from this half of the card. During the second revolution of the pin box shaft 1 the card stops 90 and 91 both remain up so that the position of the card does not change, but during this revolution, the left-hand shutter 48 is held out of operation by the hook 76a, while the right-hand shutter 49 is free to operate. Accordingly during this revolution the right-hand half of the card is sensed containing the second line of the name and address.

When the pin box has risen after this second sensing operation the cam 95 pushes the front card stop 90 downwardly, so that the feed rolls 30a which are constantly rotating, feed the card forward until it is arrested by the rear card stop 91 so that the card is now in position for sensing the third and fourth lines of the name and address.

During the third revolution of the shaft 1 the shutter 48 is again operative so that the third line of the name and address is read from the left-hand half of the card.

During the fourth revolution the rear card stop 91 remains up and the front card stop 90 still remains down so that the position of the card is unchanged. During this revolution however, the right-hand shutter 49 is operative, while the left-hand shutter 48 is inoperative, so that only the right-hand half of the card containing the fourth line of the name and address is sensed.

At the end of the fourth revolution of the main shaft 1 the cam 96 lowers the rear card stop 91 so that the feed rolls 30a eject the card which is transported by further feed rolls 30b into a receiver 109.

The picker then feeds the next following card and the cycle of operations commences once more.

In order to print the four lines of a name and address from the one card the pin box is connected through the connection box 89 to a stop basket from which the printing elements are set. This mechanism will now be described.

In the pin box there are provided sixty-five columns of sensing pins and in each half, thirty-two columns only are operative, the centre column No. 33 being unused. The shutter 48 controls the left-hand half of the pin box, columns 1 to 32 while the shutter 49 controls the right-hand half, namely, column 34 to 65.

Each of the connection wires 110 for the left-hand half of the pin box is connected to operate the same stop as the corresponding connection wire 110a in the right-hand half of the pin box (Figure 4).

It should here be noted that Figs. 4 and 4A are a view looking from the back of the machine so that the left hand wires 110 appear to the right of Fig. 4A.

The printing mechanism is similar to that described in British Specification No. 478,597, but since the present construction differs in some respects to that described in the aforesaid British specification it will now be briefly described.

The stop basket (Figure 12) comprises a frame having end plates 111 and upper and lower plates 112 in which the stops are mounted to slide vertically. The code employed in punching the card is the same as that set forth in British Specification No. 478,597 and the A and B stops are shown at 113 and 114 in Figure 12, while the 0 to 9 stops are shown at 115. There are thirty-two columns of stops and associated with each column is a setting rack 116 having a setting heel 117 pivoted thereto at 117a and controlled by a latch 118 pivoted to the rack 116 at 119 and actuated by the A and B stops 113, 114 in the manner described in British Specification No. 478,597. Latch 118 is connected to heel 117 by a spring 118a.

Each rack 116 is urged to the right by a compression spring 120 disposed around a rod 121 connected to the rack 116 at 122, and guided at its free end in an angle bar 123 (Fig. 2).

The racks 116 are normally held to the left in Figs. 2 and 12 by a restoring bar 124 (shown at the right-hand end of its stroke in Figure 12) which is mounted for reciprocation in the manner described in the aforesaid British specification, being pivoted by trunnions 124a at each end to a lever 125 (Fig. 1) pivoted to the machine frame at 126 and actuated by a cam 127 which engages a roller 125a on lever 125 and is secured to a shaft 128 driven from the main shaft 1 through a chain 129 and sprocket wheel 130.

Each rack 116 is connected through a pinion 131 freely mounted on a transverse shaft 132 and formed integrally with a pinion 133 engaging a type bar 134 having rack teeth 135 (Figures 11 and 12).

Each type bar 134 carries thirty-two effective type elements 136 and at its upper end one blank type element 136a, the characters printed by the various type elements are indicated in Figure 14. Each type element 136, 136a has a striker head 137 and a spring (not shown) tending to move it to the right, the striker head co-operating with a hammer 139 of which the operation will be explained later.

Normally each setting rack 116 is retained in its position to the left in Figs. 2 and 12 if no stop is raised, whether or not the restoring bar 124 has moved to the right. Therefore normally each type bar 134 is in its lowermost position with the blank type element 136a in printing position relatively to the platen 140.

In order to retain the setting racks 116 in their position to the left, each rack 116 is provided on its underside with a recess 141 with which normally engages a pin 142 on a vertical slide 143, these slides being mounted in comb bars 144 fixed to the machine frame and urged upwardly by springs 145. Mounted to slide horizontally in the end plates 111 of the stop basket is a slide 146 for each column of stops, and this slide has a projecting pin 147 for each stop in the column.

Near its lower end each stop has an inclined slot 148 cut therein, for example, a saw cut, and engaging in this slot is forked element 149 (Figures 12 and 13) having an upwardly directed stem 150 which passes through a hole in the lower plate 112 of the stop basket and serves as a guide for a compression spring 151 which urges the stop downwardly, the stop having a shoulder 152 engaging the plate 112 to limit the downward movement of the stop.

Formed on each stop is a cam surface 153, which when the stop is raised engages the corresponding pin 147 and pushes the slide 146 to the right, thereby rocking a bell crank 154 freely mounted on a transverse shaft 155 so as to move downwardly the corresponding vertical slide 143 to which the bell crank 154 is pivoted. By this means when any stop in a column is raised, the pin 142 is withdrawn from the recess 141 and the corresponding rack 116 is free to move to the right under the action of the spring 120 when the restoring bar 124 permits it to do so.

The hammers 139 are mounted to slide horizontally in slots formed in two vertical plates 160 (Figure 14) and are retained in these slots by comb bars 161. Pivoted in two vertical bearing plates 162 is a hammer control shaft 163 which is rocked to release the hammers by mechanism which will be described later. The shaft 163 has secured to it two arms 164 of which only one is shown, and carried between these arms is a transverse rod 165. The hammers are normally held to the right against the action of their springs 166 by a bail 167 of which the arms 168 carry pivot pins 169 passing freely through the side plates 162. Secured to the pivot pin 169 on the inside of each plate 162 is a lever 170 carrying a roller 171 engaging with the corresponding arm 164 on the shaft 163. When the shaft 163 rocks counterclockwise the arm 164 by engaging the roller 171 rocks the arm 170 and therefore the arm 168 and the bail 167 against the action of a spring 172, whereby the hammers are released and are pulled sharply to the left by their springs 166, the heads of the hammers engaging the striker element 137 of the type element 136 which has been positioned in the path of the respective hammers.

The hammers are restored to the right by the rod 165 carried between the arms 164, which rod engages a shoulder 173 on each hammer. As the rod 165 returns the hammers so the spring 172 returns the bail 167 into position to lock the hammers in their right-hand position.

Outside the left-hand plate 162 the shaft 163 carries secured to it an operating arm 174 (Fig. 1) pivoted to an operating link 175 which is urged downwardly by a spring 176, and at its lower end is slotted at 177 to pass round the shaft 128 (see also Fig. 15).

Secured to the shaft 128 is a cam 178 which at each revolution of the shaft 128 engages a roller 179 on the link 175 and pushes the link upwardly to rock the shaft 163 counterclockwise, whereby the hammers are operated.

The paper on which printing is effected passes round the platen 140 which is rotated step by step through gearing 180 from a ratchet wheel 181 secured to a shaft 182, and operated by a pawl 183 formed on the upper end of a link 184.

This link is guided at its upper end by means of a slot 185 engaging a pin 186 secured to the machine frame, and at its lower end is slotted at 187 to pass round the shaft 128 (Figs. 1 and 15).

Secured to the shaft 128 is a cam 188 which at each revolution of the shaft 128 engages a roller 189 on the link 184 whereby the pawl 183 is moved upwardly and rotates the ratchet wheel 181 by one tooth, whereby the platen 140 is fed one line space.

Figure 17 illustrates a card punched for use with the machine according to the invention, shown in Figures 1 to 16.

The card 200 shown in Figure 17 is of standard dimensions and has 65 columns disposed at .107 inch pitch. The vertical lines 201 indicate the positions of the columns and the horizontal lines 202 indicate the normal spacing of the rows of hole positions across the card, the character represented by each row being indicated at the left-hand end thereof in Figure 17.

The card shown in Figure 17 is punched with a name and address, which when printed under the control of the card would appear as follows:

LEONARD BROWN
68 Lazlewell Rd
PUTNEY
S W 5

In each column there are 12 upper hole positions and 12 lower hole positions. The upper hole positions are indicated by the horizontal lines 202 and the lower hole positions are in the spaces between the horizontal lines.

Columns 1 to 32 are utilised to receive the first and third lines of the address, while columns 34-65 are utilised to receive the second and fourth lines of the address.

Thus in column 1 there are four holes punched, viz., one hole 203 in the upper A position, a hole 204 in the upper 7 position, a hole 205 in the lower B position and a hole 206 in the lower 0 position. The pair of holes 203 and 204 represent L, the first letter of the name Leonard occurring in the first line of the address, and the pair of holes 205 and 206 represent P, the first letter of the place name Putney occurring in the third line of the address.

The first character 6 of the second line of the address is punched at 207 in the upper 6 position in column 34, in order that the digit 6 when printed may appear below the letter L in the first line. The first character S of the fourth line is punched at 208 in the lower 8 position in column 34, since as explained in British Specification No. 454,857 the same character is made to represent both S and 8.

During the first of the four reciprocations of the pin box the upper hole positions in columns 1 to 32 are sensed, and during the second reciprocation the upper hole positions in columns 34 to 65 are sensed. The front card stop 90 is then lowered and the card moves forward to an extent $x$ equal to half the pitch of the horizontal lines 202, to bring the lower hole positions into position for sensing.

During the third reciprocation of the pin box the lower hole positions in the columns 1 to 32 are sensed and during the fourth reciprocation the lower hole positions in columns 34 to 65 are sensed.

It will be seen that in a card punched for use with a machine according to the invention a relatively long name and address may be punched, e. g., one in which there are 32 characters (including spaces) in each of four lines thereof.

What I claim is:

1. In a record card controlled statistical machine the combination of a reciprocable sensing pin box, means for arresting and holding a card in a first sensing position relative to said pin box during two consecutive reciprocations of the pin box and for then releasing said card, means for arresting and holding the card in a second sensing position relative to said pin box during the next two consecutive reciprocations of the pin box and for then releasing said card, said second sensing position being spaced relatively to said first sensing position one half the pitch of the sensing pins along the card path, a plurality of columns of settable stops, a first transmission means for setting said stops from one group of columns of pins in the pin box, a second transmission means for setting the same stops from another group of columns of pins in the pin box, a disabling device to each of said transmission means, means for rendering the disabling device for the first transmisison means effective and ineffective at alternate reciprocations of the pin box, and means for rendering the disabling device for the second transmission means ineffective when the other disabling device is effective and vice versa.

2. In a record card controlled statistical machine the combination of a reciprocable sensing pin box, a plurality of columns of stops, a first transmission means for setting said stops from one group of columns of sensing pins in the pin box, a second transmission means for setting the same stops from a different group of columns of sensing pins in the pin box, a disabling device to each of said transmission means, means for rendering the disabling device for the first transmission means effective and ineffective at alternate reciprocations of the pin box, means for rendering the disabling device for the second transmission means ineffective when the other disabling device is effective and vice versa, two card stops, relatively spaced one half the pitch of the sensing pins along the path of card feed, and operating means for said card stops adapted to move both card stops into the card path prior to the descent of the pin box in one reciprocation thereof, to withdraw the first card stop from the card path upon the ascent of the pin box in the next following reciprocation thereof, and to withdraw the rear card stop upon the ascent of the pin box which occurs two reciprocations later than said next following reciprocation.

3. In a record card controlled statistical machine the combination of a reciprocable sensing pin box, printing mechanism, means for setting said printing mechanism, a first transmission means for actuating said setting means under the control of one group of columns of sensing pins in the pin box, a second transmission means for actuating said setting means under the control of a different group of columns of sensing pins in the pin box, a disabling device to each of said transmisison means, means for rendering the disabling device for the first transmission means effective and ineffective at alternate reciprocations of the pin box, means for rendering the disabling device for the second transmission means ineffective when the other disabling device is effective and vice versa, two card stops, relatively spaced one half the pitch of the sensing pins along the card path, operating means for said card stops adapted to move both card stops into the card path prior to the descent of the pin box in one reciprocation thereof, to withdraw the front card stop from the card path upon the ascent of the pin box in the next following reciprocation thereof, and to withdraw the rear card stop upon the ascent of the pin box which occurs two reciprocations later than said next following reciprocation, means for causing the printing mechanism to print at each sensing operation, means for feeding paper past said printing mechanism, and means for actuating said paper feeding means at each sensing operation.

ARTHUR THOMAS.